(12) United States Patent
Furihata et al.

(10) Patent No.: US 12,087,197 B2
(45) Date of Patent: *Sep. 10, 2024

(54) DEVICE AND METHOD FOR DRIVING A DISPLAY PANEL USING A SCALED GAMMA CURVE

(71) Applicant: Synaptics Incorporated, San Jose, CA (US)

(72) Inventors: Hirobumi Furihata, Tokyo (JP); Tomoo Minaki, Tokyo (JP); Masao Orio, Tokyo (JP); Takashi Nose, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,442

(22) Filed: Aug. 11, 2022

(65) Prior Publication Data

US 2022/0392385 A1 Dec. 8, 2022

Related U.S. Application Data

(63) Continuation of application No. 17/148,364, filed on Jan. 13, 2021, now Pat. No. 11,443,671.

(51) Int. Cl.
*G09G 3/20* (2006.01)
(52) U.S. Cl.
CPC .......... *G09G 3/20* (2013.01); *G09G 2310/027* (2013.01); *G09G 2320/0276* (2013.01); *G09G 2320/0626* (2013.01); *G09G 2320/0673* (2013.01)

(58) Field of Classification Search
None
See application file for complete search history.

(56) References Cited

U.S. PATENT DOCUMENTS

| | | | |
|---|---|---|---|
| 2019/0197944 A1* | 6/2019 | Kim | G06V 40/1318 |
| 2019/0228740 A1* | 7/2019 | Aflatooni | G06V 40/13 |
| 2019/0278967 A1 | 9/2019 | Shepelev | |
| 2019/0340974 A1 | 11/2019 | Ka | |
| 2021/0358379 A1* | 11/2021 | Li | H10K 59/121 |

\* cited by examiner

*Primary Examiner* — Amr A Awad
*Assistant Examiner* — Donna V Bocar
(74) *Attorney, Agent, or Firm* — Leydig, Voit & Mayer, Ltd.

(57) ABSTRACT

A display driver comprises control circuitry configured to store a default gamma curve, determine a count of in-region pixels of a target pixel in a display panel and neighboring pixels of the target pixel, the in-region pixels being located in a predetermined region of the display panel, and determine a scale factor based on a ratio of the count of the in-region pixels to a total number of the target pixel and the neighboring pixels. The control circuitry also determines a modified gamma curve by scaling the default gamma curve with the scale factor. The display driver further comprises image processing circuitry configured to apply a gamma transformation based on the modified gamma curve to image data defined for the target pixel to generate output voltage data for the target pixel.

20 Claims, 14 Drawing Sheets

DEVICE AND METHOD FOR DRIVING A DISPLAY PANEL USING A SCALED GAMMA CURVE

RELATED APPLICATIONS

This application is a continuation application of U.S. application Ser. No. 17/148,364, filed Jan. 13, 2021, the entirety of which is hereby incorporated by reference.

FIELD

The disclosed technology generally relates to a display driver, display device and method for driving a display panel.

BACKGROUND

A display device may be configured to display a part of an image with a brightness level higher than that of the remaining part of the image. This configuration may be used to illuminate a user's finger placed on the display panel during an optical finger print recognition. In such implementations, the user may be asked to put the user's finger on a predetermined region of the display panel, and the display device may be configured to increase the brightness level of the predetermined region to illuminate the user's finger.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a display driver is provided. The display driver comprises control circuitry configured to store a default gamma curve, determine a count of in-region pixels of a target pixel in a display panel and neighboring pixels of the target pixel, the in-region pixels being located in a predetermined region of the display panel, and determine a scale factor based on a ratio of the count of the in-region pixels to a total number of the target pixel and the neighboring pixels. The control circuitry is further configured to determine a modified gamma curve by scaling the default gamma curve with the scale factor. The display driver further comprises image processing circuitry configured to apply a gamma transformation based on the modified gamma curve to image data defined for the target pixel to generate output voltage data for the target pixel.

In one or more further embodiments, a semiconductor device is provided. The semiconductor device comprises storage circuitry configured to store a default gamma curve and control circuitry configured to determine a count of in-region pixels of a target pixel in a display panel and neighboring pixels of the target pixel, the in-region pixels being located in a predetermined region of the display panel, and determine a scale factor based on a ratio of the count of the in-region pixels to a total number of the target pixel and the neighboring pixels. The control circuitry is further configured to determine a modified gamma curve by scaling the default gamma curve with the scale factor. The semiconductor device further comprises image processing circuitry configured to apply a gamma transformation based on the modified gamma curve to image data defined for the target pixel to generate output voltage data for the target pixel.

In one or more further embodiments, a method is provided. The method comprises storing a default gamma curve, determining a count of in-region pixels of a target pixel in a display panel and neighboring pixels of the target pixel, the in-region pixels being located in a predetermined region of the display panel, and determining a scale factor based on a ratio of the count of the in-region pixels to a total number of the target pixel and the neighboring pixels. The method further comprises determining a modified gamma curve by scaling the default gamma curve with the scale factor and applying a gamma transformation based on the modified gamma curve to image data defined for the target pixel to generate output voltage data for the target pixel.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1A:
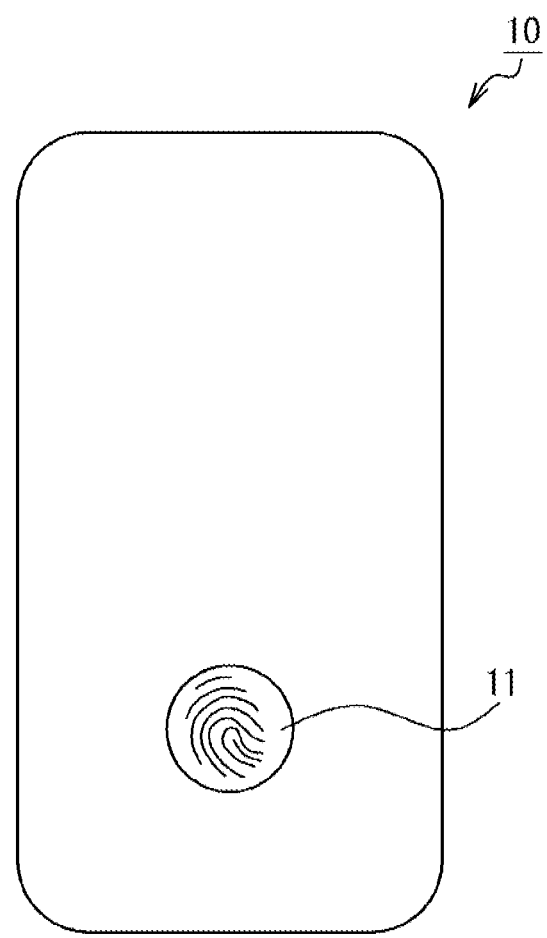
FIG. 1A, FIG. 1B, and FIG. 1C illustrates example local high brightness (LHB) regions defined on a display panel, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. Suffixes may be attached to reference numerals for distinguishing identical elements from each other. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

A display device may be configured to display a part of an image with a brightness level higher than that of the remaining part of the image. In one implementation, the display device may be configured to increase the display brightness level of a predetermined region of a display panel than that of the region external to the predetermined region. Hereinafter, the predetermined region may be also referred to as local high brightness (LHB) region, and the region external to the LHB region may be also referred to as background region. In one or more embodiments, the display brightness level of the LHB region is locally increased in response to an activation of an LHB mode. In some embodiments, the display brightness level may be made uniform over the display panel in response to a deactivation of the LHB mode. The term "uniform" referred herein include substantially uniform.

The LHB region may be used to illuminate a user's finger during an optical finger print recognition. In one implementation, a user is asked to place a user's finger on the LHB region for finger print recognition and the user's finger is illuminated by light emitted from the LHB region while finger print information is optically acquired by an optical finger print sensor.

The LHB region may be used for other purposes. For example, the LHB region may be used to emphasize a desired portion of an image displayed on the display panel. The emphasizing may be performed under control of an entity external to the display device and/or in response to a user operation.

In one or more embodiments, disposing an LHB region on the display panel may include adjusting a gamma transformation applied to input image data in a display driver configured to provide output voltages to pixel circuits of the display panel to update the pixel circuits. The gamma transformation may convert graylevels specified by the input image data for respective pixel circuits into voltage values that specify output voltage levels with which the pixel circuits are updated. In some embodiments, the gamma transformation may be adjusted to increase luminances of the pixel circuits disposed in the LHB region compared to luminances of those in the background region.

The input-output property of the gamma transformation may be represented by a gamma curve. The gamma curve may correlate input graylevels with output voltage levels. In such embodiments, the gamma curve may be adjusted to increase luminances of the pixel circuits disposed in the LHB region.

One issue may be that an improper adjustment of the gamma transformation (or the gamma curve) may cause an undesired appearance of the LHB region. In one implementation, an improper adjustment of the gamma transformation may cause the LHB region to have a jagged boundary. In another implementation, an improper adjustment of the gamma transformation may cause an abrupt change in the brightness at the boundary of the LHB region.

In other implementations, a display panel may include a pixel existing region in which pixel circuits are disposed and a pixel absent region in which no pixel circuits are disposed. In such implementations, the brightness level in the pixel existing region is inevitably higher than that in the pixel absent region. In some cases, the boundary between the pixel existing region and the pixel absent region may be jagged due to the pixel configuration of the pixel existing region, and the jagged boundary may cause a poor appearance at the boundary.

The present disclosure offers various technologies to improve the appearance of the LHB region and/or the pixel existing region. In one or more embodiments, a display driver includes control circuitry and image processing circuitry. The control circuitry is configured to store a default gamma curve and determine a scale factor based on a location of a target pixel circuit in a display panel. The control circuitry is further configured to determine a modified gamma curve by scaling the default gamma curve with the scale factor. The image processing circuitry configured to apply a gamma transformation based on the modified gamma curve to image data defined for the target pixel to generate output voltage data for the target pixel circuit.

Figure 1B:
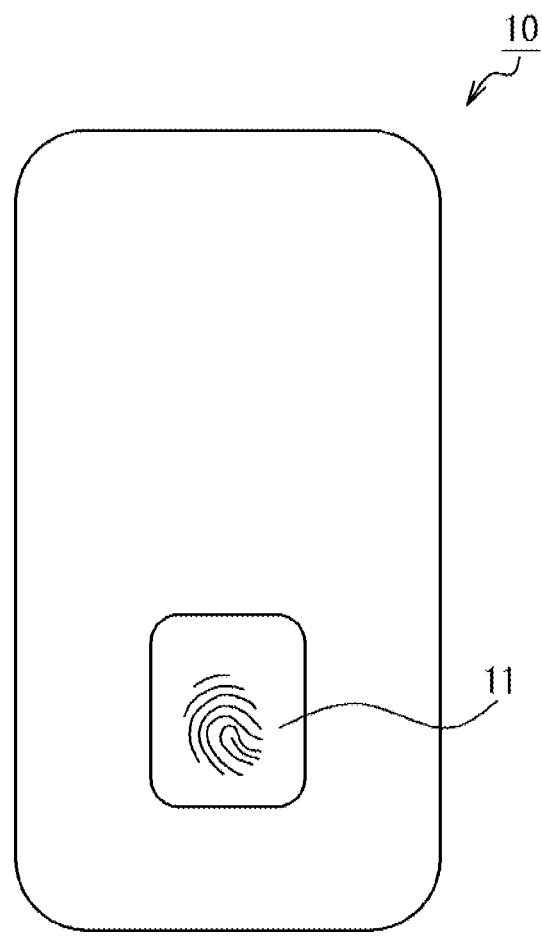
Figure 1C:
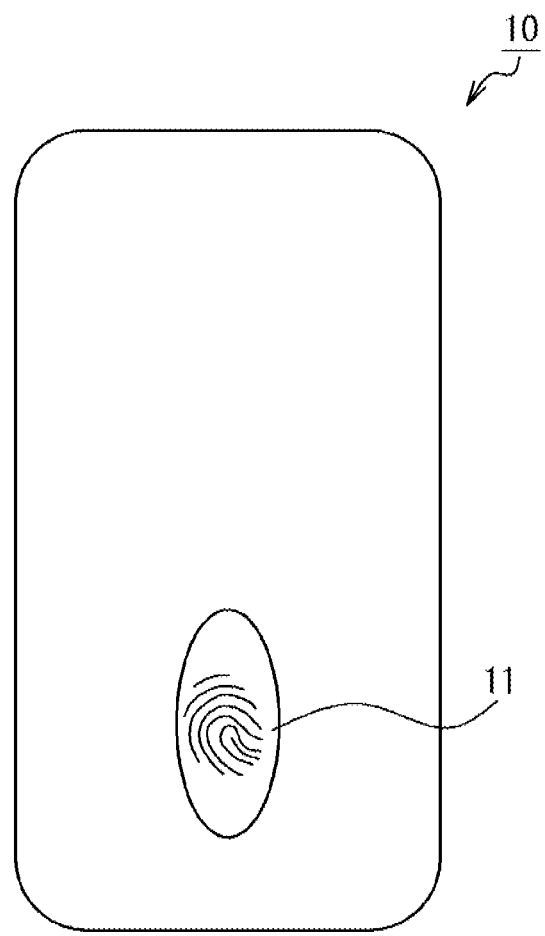

FIGS. 1A to 1C illustrate example configurations of an LHB region 11 on a display panel 10, according to various embodiments. In each of the examples, the region of the display panel 10 that is outside of the LHB region is the background region. The LHB region 11 may have various shapes. In one implementation, the LHB region 11 may be circular as illustrated in FIG. 1A. In another implementation, the LHB region 11 may be rectangular with rounded corners as illustrated in FIG. 1B. In still another implementation, the LHB region 11 may be oval as illustrated in FIG. 1C. In one or more embodiments, a display driver that drives the display panel 10 may be configured to define the LHB region 11 with various shapes.

Figure 2:
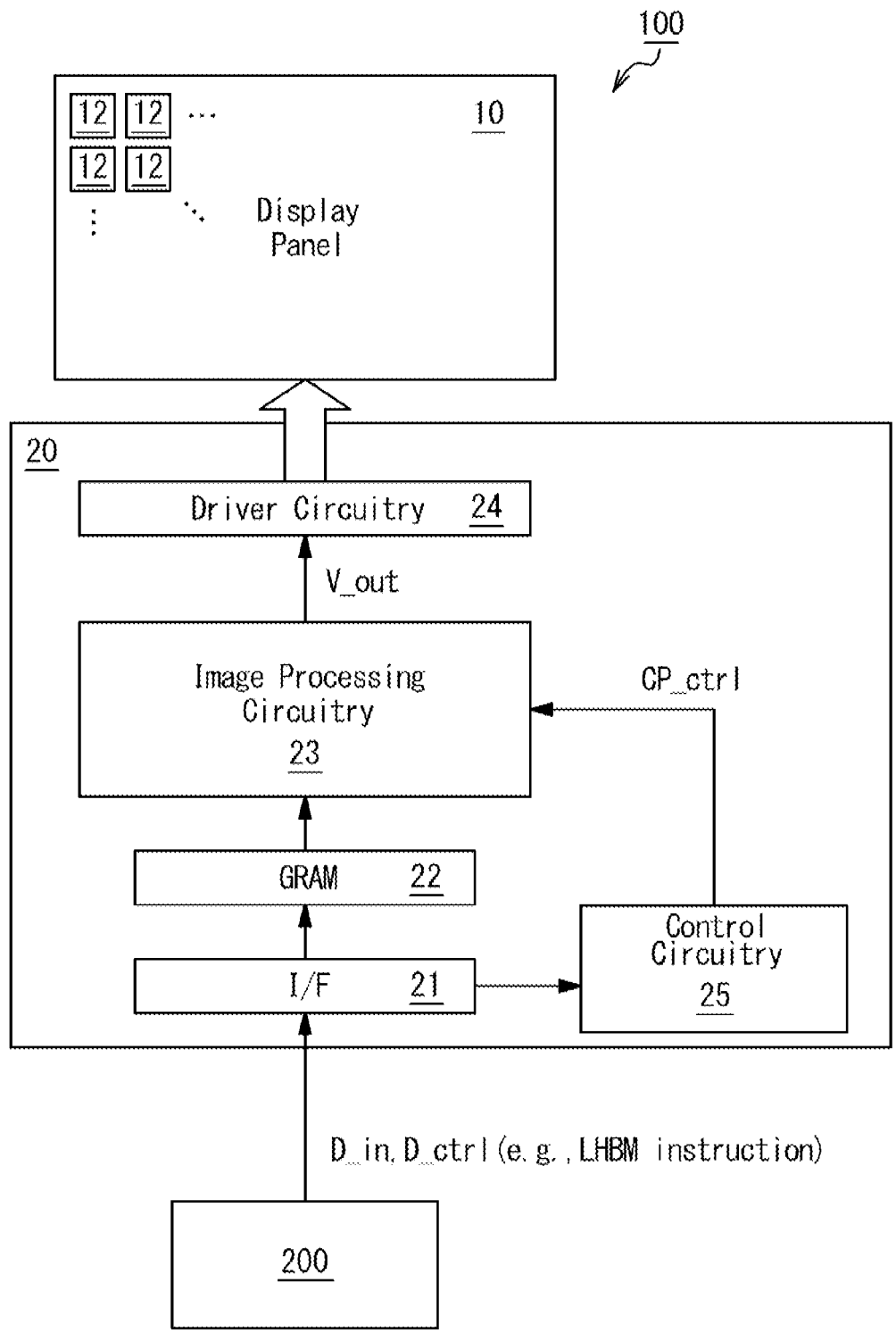
FIG. 2 illustrates an example configuration of a display device, according to one or more embodiments.

FIG. 2 illustrates an example configuration of a display device 100, according to one or more embodiments. In the illustrated embodiment, the display device 100 includes a display panel 10 and a display driver 20. The display panel 10 may be an organic light emitting diode (OLED) display panel, a micro light emitting diode (LED) display panel, a liquid crystal display (LCD) panel, or other types of display panels. The display panel 10 includes a plurality of pixel circuits 12. Each pixel circuit 12 may be configured to display one of the elementary colors (e.g., red, green, or blue), and each pixel of the display panel 10 may include three or more pixel circuits 12 configured to display different elementary colors.

In one or more embodiments, the display driver 20 is configured to control the display panel 10 to display a desired image on the display panel 10. Displaying the desired image may include disposing an LHB region 11 on the display panel 10 as described in relation to FIGS. 1A to 1C. In one implementation, the display driver 20 is configured to display the desired image on the display panel 10 in response to input image data D_in and control data D ctrl received from an entity 200 external to the display driver 20. The desired image may span all or a portion of both the LHB region 11 and the background region. The entity 200 may be a host, an application processor, a central processing unit (CPU), or other types of processors. The input image data D_in may include pixel data for the pixels of the display panel 10. The pixel data for each of the pixels may include graylevels specified for the pixel circuits 12 of the corresponding pixel. The control data D ctrl may include a local high brightness mode (LHBM) instruction that instructs the display driver 20 to activate an LHB mode. In such embodiments, the display driver 20 may be configured to increase the display brightness level of the LHB region 11 in response to the activation of the LHB mode.

In the illustrated embodiment, the, the display driver 20 includes interface (I/F) circuitry 21, a graphic random-access memory (GRAM) 22, image processing circuitry 23, driver circuitry 24, and control circuitry 25. In some implementations, the interface circuitry 21, the GRAM 22, the image processing circuitry 23, the driver circuitry 24, and the control circuitry 25 may be monolithically integrated in one semiconductor device (e.g., an integrated circuit (IC) chip). In other implementations, these components may be distributedly integrated in a plurality of semiconductor devices. For example, the image processing circuitry 23 and the control circuitry 25 may be integrated in separate semiconductor devices or IC chips.

The interface circuitry 21 is configured to receive the input image data D_in from the entity 200 and forward the received input image data D_in to the GRAM 22. In other embodiments, the interface circuitry 21 may be configured to process the received input image data D_in and send the processed image data to the GRAM 22.

The GRAM 22 is configured to temporarily store the input image data D_in and forward the stored input image data D_in to the image processing circuitry 23. In other embodiments, the GRAM 22 may be omitted and the input image data D_in may be directly supplied to the image processing circuitry 23 from the interface circuitry 21.

The image processing circuitry 23 is configured to apply desired image processing (e.g., color adjustment, subpixel rendering, image scaling) to the input image data D_in received from the GRAM 22 to generate and provide output voltage data V_out to the driver circuitry 24. The output voltage data V_out may include voltage values that specify voltage levels of output voltages with which the pixel circuits 12 in the display panel 10 are to be updated. The image processing performed in the image processing circuitry 23 includes a gamma transformation that converts graylevels into voltage values. In one implementation, the gamma transformation is adjusted to dispose the LHB region 11 on the display panel 10.

The driver circuitry 24 is configured to drive or update the pixel circuits 12 based on the output voltage data V_out. The driver circuitry 24 may be configured to generate output voltages having voltage levels as specified by the output voltage data V_out and supply the generated output voltages to the corresponding pixel circuits 12.

Figure 3:
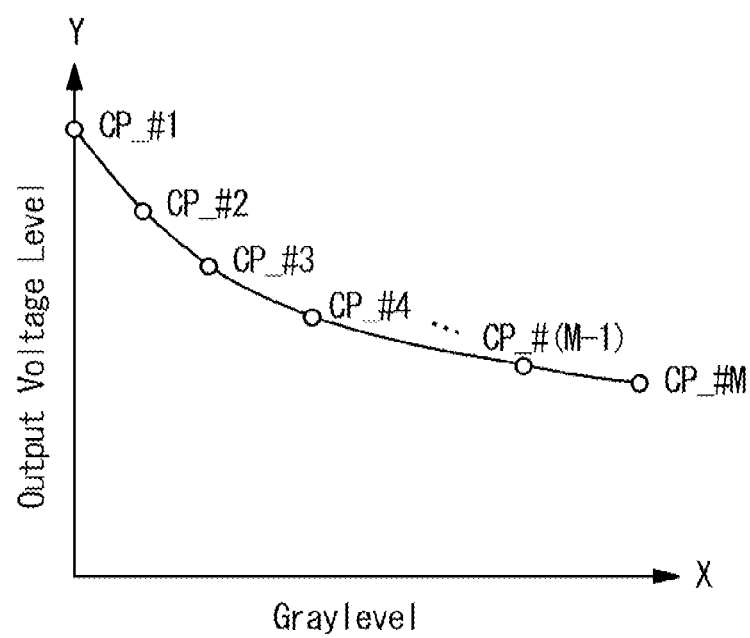
FIG. 3 illustrates an example gamma curve, according to one or more embodiments.

The control circuitry 25 is configured to control the gamma transformation performed in the image processing circuitry 23. In one or more embodiments, the input-output property of the gamma transformation is represented by a gamma curve. FIG. 3 illustrates an example gamma curve, according to one or more embodiments. As shown in FIG. 3, the gamma curve matches an input graylevel (shown on the X-axis) to an output voltage level (shown on the Y-axis). In one or more embodiments, for each pixel circuit, the gamma transformation transforms the input graylevel to the output voltage level using the gamma curve. In the illustrated embodiment, the gamma curve is defined such that the output voltage level decreases as the graylevel increases. This type of gamma curve is adapted to implementations in which each pixel circuit 12 of the display panel 10 is configured such that the luminance of the pixel circuit 12 decreases as the output voltage level increases.

In one or more embodiments, the gamma curve (or the input-output property of the gamma transformation) is defined with a set of control points. FIG. 3 illustrates an example gamma curve and example control points that define the gamma curve, according to one or more embodiments. In the illustrated embodiment, the shape of the gamma curve is specified with M control points CP_#1 to CP_#M, where M is an integer of three or more. The gamma curve may be a free-form curve (e.g., a Bezier curve) defined by the control points CP_#1 to CP_#M. The control points CP_#1 to CP_#M may be defined in an XY coordinate system which is defined with an X-axis (or a first axis) that represents graylevels and a Y-axis (or a second axis) that represents output voltage levels. In such embodiments, the locations of the control points CP_#1 to CP_#M may be indicated by X and Y coordinates in the XY coordinate system.

In embodiments where the gamma curve is defined with a set of control points, the control circuitry 25 may be configured to generate control point data CP_ctrl to adjust the gamma curve as illustrated in FIG. 2. The control point data CP_ctrl may specify the locations of the control points CP_#1 to CP_#M. The control circuitry 25 may be configured to provide the control point data CP_ctrl to the image processing circuitry 23. In such embodiments, the image processing circuitry 23 is configured to perform the gamma transformation in accordance with the gamma curve defined with the control points CP_#1 to CP_#M. The control point data CP_ctrl may include the X coordinates of the control points CP_#1 to CP_#M and the Y coordinates of the control points CP_#1 to CP_#M.

Figure 4:
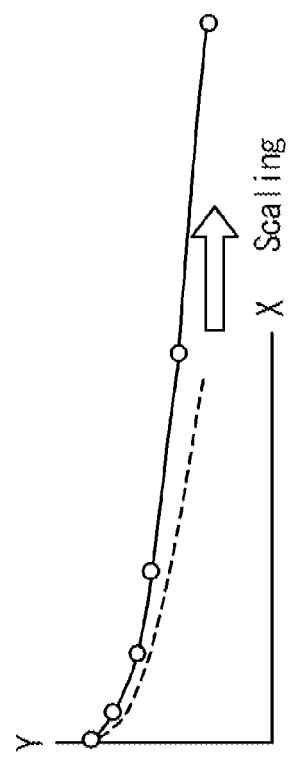
FIG. 4 illustrates an example adjustment of the gamma curve, according to one or more embodiments.
Figure 4:
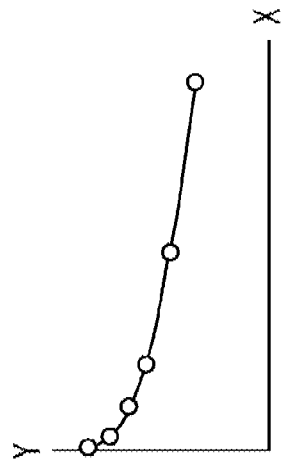

FIG. 4 illustrates an example adjustment of the gamma curve, according to one or more embodiments. The X and Y axes of graphs shown in FIG. 4 are the same as shown in FIG. 3. In the illustrated embodiment of FIG. 3, the adjustment of the gamma curve includes defining a default gamma curve. The default gamma curve may be stored in the control circuitry 25. In one implementation, the default gamma curve may be defined as a predetermined gamma curve for the LHB region 11. The adjustment of the gamma curve further includes determining a modified gamma curve for the background region (the region other than the LHB region 11) by scaling the default gamma curve along the X axis, which represents graylevels. Since the enlargement of a gamma curve along the X axis decreases the display brightness level, in one implementation, the gamma curve for the background region is defined by enlarging the default gamma curve defined for the LHB region 11 along the X axis. In embodiments where the default gamma curve is defined with a set of control points, which are indicated by the circles on the graph in FIG. 4, scaling the default gamma curve may be achieved by moving one or more of the control points along the X axis. In one implementation, scaling of the default gamma curve with a scale factor is achieved by multiplying the X coordinates of the control points that defines the default gamma curve by the scale factor.

Figure 5:
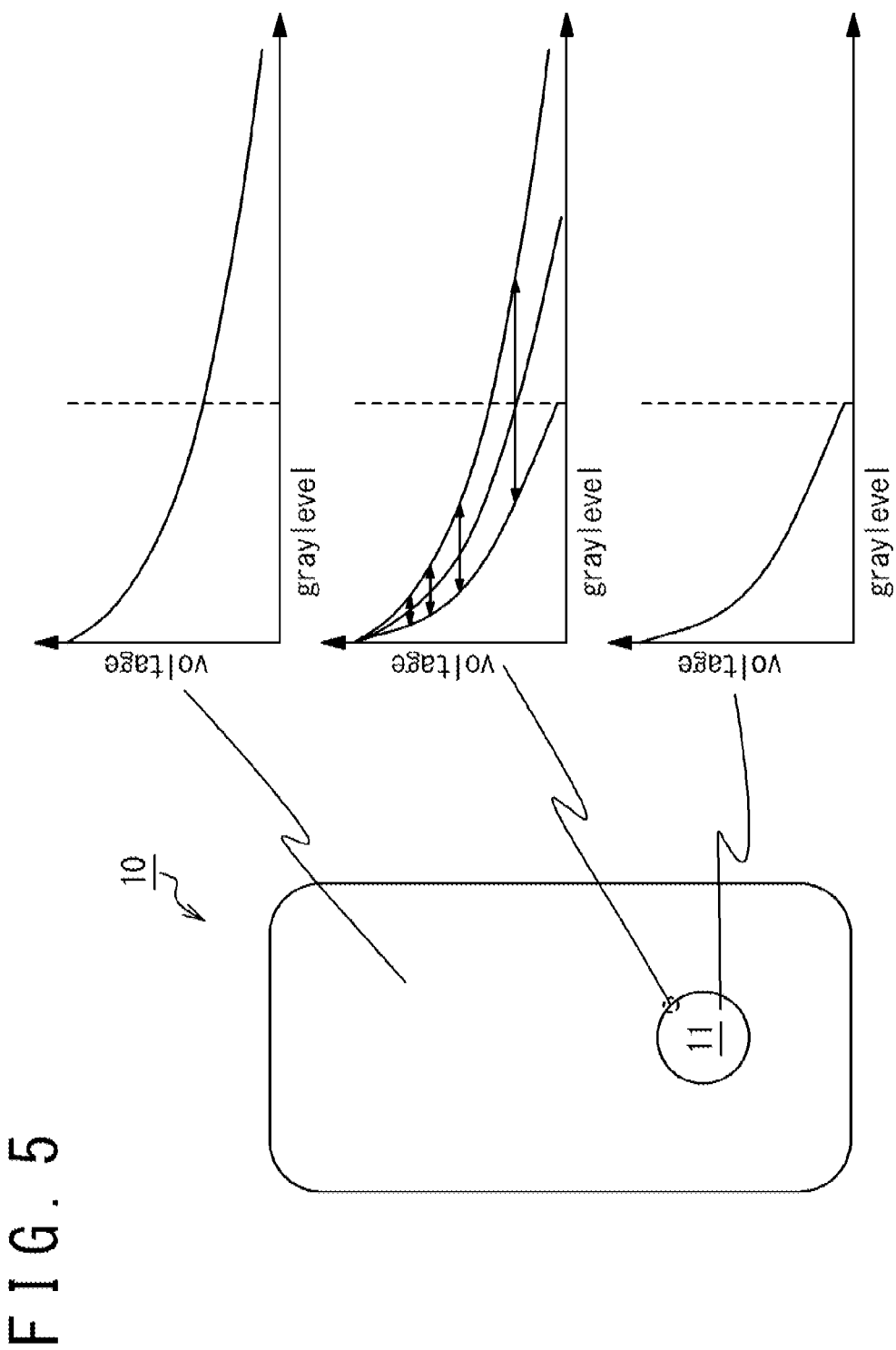
FIG. 5 illustrates another example adjustment of the gamma curve, according to one or more embodiments.

FIG. 5 illustrates another example adjustment of the gamma curve, according to one or more embodiments. The bottom graph illustrates the gamma curve defined for the LHB region 11, and the top graph illustrates the gamma curve for the background region. The gamma curve for the background region may be acquired by scaling (or enlarging) the gamma curve for the LHB region 11 with a first scale factor. To avoid an abrupt change in the display brightness level between LHB region 11 and the background region, a gamma curve for a location near the boundary may be defined by scaling the gamma curve defined for the LHB region 11 by a second scale factor smaller than the first scale factor. The middle graph illustrates the gamma curve for the location near the boundary. The second scale factor may be determined depending on the location of the target pixel of the gamma transformation.

Figure 6A:
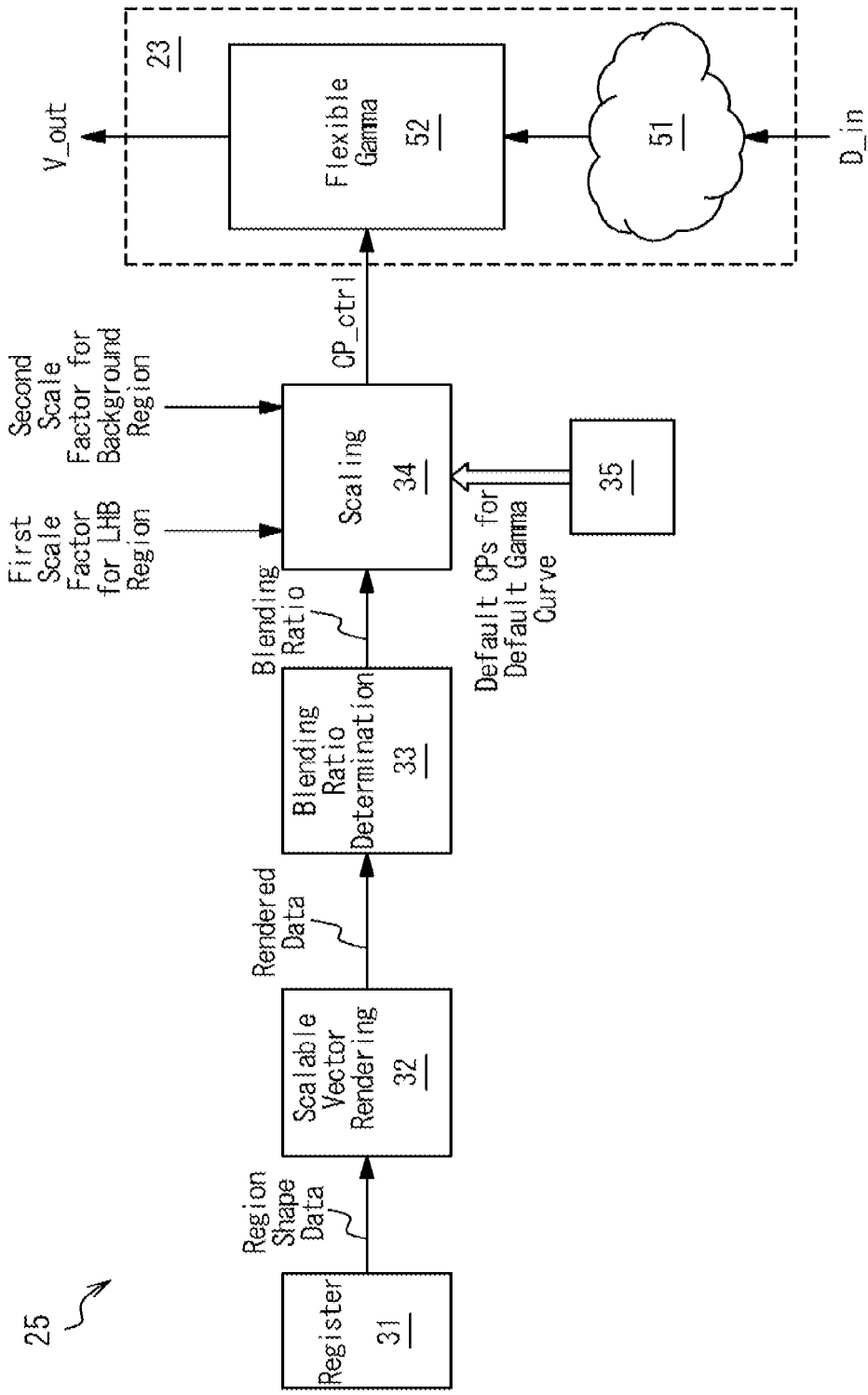
FIG. 6A illustrates example partial configurations of the image processing circuitry and the control circuitry, according to one or more embodiments.

FIG. 6A illustrates example partial configurations of the image processing circuitry 23 and the control circuitry 25, according to one or more embodiments. In the illustrated embodiment, the image processing circuitry 23 includes an image processing component 51 and flexible gamma circuitry 52. In some embodiments, the image processing component 51 is configured to apply desired image processing (e.g., color adjustment, scaling, and subpixel rendering) to the input image data D_in to generate processed image data. In other embodiments, the image processing component 51 may be omitted. The flexible gamma circuitry 52 is configured to apply a gamma transformation based on the control point data CP_ctrl to the processed image data received from the image processing component 51 to generate the output voltage data V_out. The gamma transformation may be performed in accordance with a gamma curve defined by the control point data CP_ctrl, where the control point data CP_ctrl includes the locations (e.g., the X and Y coordinates) of the control points. In other embodiments, the image processing circuitry 23 may further include another image processing component that process the output voltage data V_out.

In the illustrated embodiment, the control circuitry 25 includes register circuitry 31, scalable vector rendering circuitry 32, blending ratio determination circuitry 33, scaling circuitry 34, and storage circuitry 35. The register circuitry 31 is configured to store region shape data that represents the shape of the LHB region 11. The region shape data may include vector graphics data that represents the shape of the LHB region 11 in a vector graphics format. The region shape data may define the boundary of the LHB region 11. In one implementation, the boundary of the LHB region 11 may be a free-form curve defined with a set of control points. In such embodiments, the region shape data may be indicative of locations of the control points for the free-form curve. The boundary of the LHB region 11 may be a series of a plurality of free-form curves joined end to end where the last point of one curve coincides with the starting point of the next curve, each free-form curve defined with a set of control points. In such embodiments, the region shape data may be indicative of locations of the control points for each free-form curve. Each of the free-form curves may be a Bezier curve defined with a set of control points. In some implementations, each free-form curve is a quadrature Bezier curve defined with three control points. In other implementations, each free-form curve is a cubic Bezier curve or a higher-order Bezier curve defined with four or more control points.

Figure 6B:
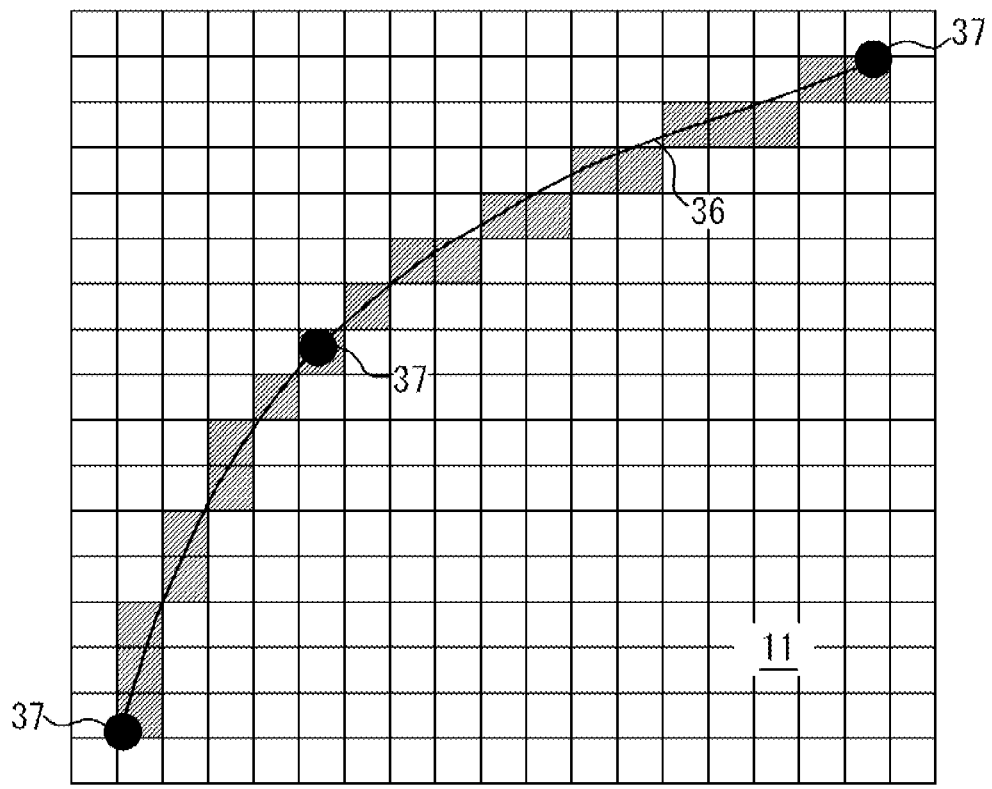
FIG. 6B illustrates an example definition of a part of the boundary of an LHB region, according to one or more embodiments.

FIG. 6B illustrates an example definition of the boundary of the LHB region 11, according to one or more embodiments. In FIG. 6B, a part of the boundary of the LHB region 11 is illustrated as being defined as a quadrature Bezier curve 36 defined with three control points 37. In FIG. 6B, the hatched boxes indicate pixels located on the boundary of the LHB region 11, and the white boxes indicate pixels not located on the boundary. In the illustrated embodiments, the region shape data may describe locations of the control points in the display panel 1. The remaining part of the boundary of the LHB region 11 may be defined as a Bezier curve or a composite Bezier curve.

Figure 6C:
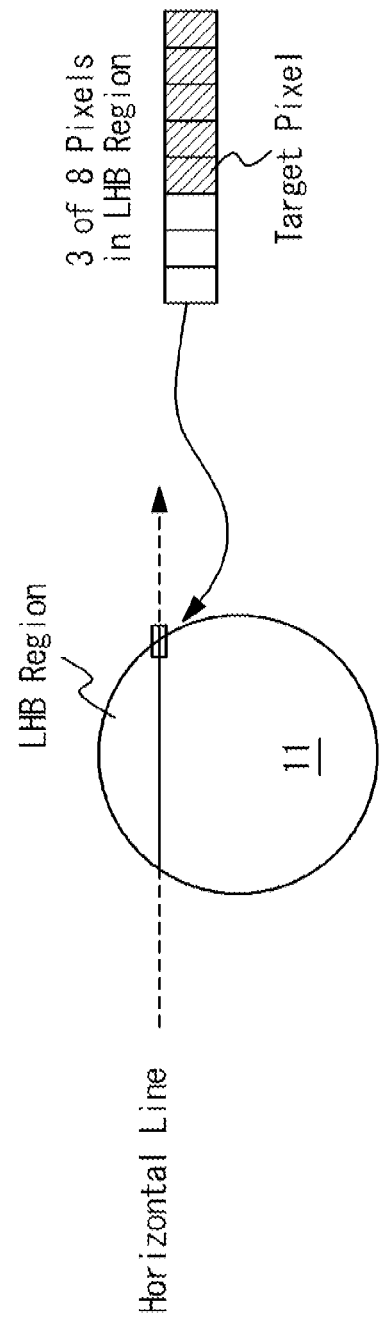
FIG. 6C illustrates an example target horizontal line, according to one or more embodiments.

The scalable vector rendering circuitry 32 is configured to render the boundary of the LHB region 11 based on the region shape data and determine the locations at which a target horizontal line of the gamma transformation crosses the boundary of the LHB region 11. FIG. 6C illustrates an example target horizontal line, according to one or more embodiments. A horizontal line may be a line of pixels arrayed in a horizontal direction of the display panel 10. The horizontal direction may be the direction in which scan lines (or gate lines) are extended in the display panel 10. The target horizontal line may be the horizontal line on which a target pixel of the gamma transformation is located. In embodiments where the boundary of the LHB region 11 is defined as a free-form curve or a series of free-form curves (e.g., defined as a Bezier curve or a composite Bezier curve), the region shape data may indicate locations of control points that define the free-form curve or the series of the free-form curves and the scalable vector rendering circuitry 32 may be configured to render the boundary of the LHB region 11 based on the control points. When the target horizontal line crosses the boundary of the LHB region 11, one or more of the pixels in the target horizontal line are located in the LHB region 11. When the target horizontal line does not cross the boundary of the LHB region 11, none of the pixels in the target horizontal line is located in the LHB region 11.

Referring back to FIG. 6A, the blending ratio determination circuitry 33 is configured to determine a blending ratio for the target pixel based on the rendered data. The determined blending ratio is used to determine the scale factor of the scaling of the gamma curve by the scaling circuitry 34 as described later in detail.

FIG. 6C illustrates an example determination of the blending ratio, according to one or more embodiments. The blending ratio is determined based on the location of the target pixel in the display panel 10. In one implementation, the blending ratio determination circuitry 33 is configured to select the target pixel and a predetermined number of neighboring pixels of the target pixel from the pixels located on the target horizontal line. In the illustrated embodiment, eight pixels, including the target pixel, are selected. The blending ratio determination circuitry 33 may be further configured to determine, based on the locations at which the target horizontal line crosses the boundary of the LHB region 11, whether each of the target pixel and the neighboring pixels is located in the predetermined region and determine the count of in-region pixels located in the LHB region 11 of the selected target pixel and neighboring pixels. When a pixel is on the boundary of the LHB region 11, the count for the pixel may be determined as the ratio of the area of the part of the pixel that falls in the LHB region 11 to the total area of the pixel. For example, when 50% of the total area of a pixel falls in the LHB region 11, the count for the pixel may be determined as 0.5.

The blending ratio determination circuitry 33 may be further configured to determine the blending ratio based on the ratio of the count of the in-region pixels to the total number of the selected target pixel and neighboring pixels. In one implementation, the blending ratio determination circuitry 33 may be configured to determine the blending ratio as being the ratio of the count of the in-region pixels to the total number of the selected target pixel and neighboring pixels. In embodiments where three of the eight selected pixels are located in the LHB region 11, for example, the blending ratio may be determined as 0.375 (=3/8).

The scaling circuitry 34 is configured to determine the gamma curve for the gamma transformation performed by the flexible gamma circuitry 52. In one or more embodiment, determining the gamma curve used for the gamma transformation includes scaling a default gamma curve along the X axis, which represents graylevels. The default gamma curve may be stored in the storage circuitry 35. The scale factor of the scaling of the default gamma curve for the target pixel is dependent on the blending ratio determined for the target pixel. In one implementation, the scaling circuitry 34 may be configured to receive a first scale factor for the LHB region 11 and a second scale factor for the background region. The first scale factor may be determined based on the desired display brightness level for the LHB region 11, and the second scale factor may be determined based on the desired display brightness level for the background region. The scaling circuitry 34 may be further configured to determine the scale factor used to scale the default gamma curve as a weighted sum of the first scale factor and the second scale factor, where the weighting factors are determined based on the blending ratio received from the blending ratio determination circuitry 33. This scheme to determine the scale factor used to scale the default gamma curve mitigates a change in the brightness at the boundary between the LHB region 11 and the background region, avoiding a jagged boundary being visually perceived in the displayed image. In embodiments where the default gamma curve is defined for the LHB region 11, the first scale factor defined for the LHB region 11 may be one.

In one or more embodiments, the default gamma curve is defined with a set of default control points (CPs), and the scaling circuitry 34 is configured to generate the control point data CP_ctrl using the set of default control points. In one implementation, the storage circuitry 35 may be configured to store the locations of the default control points.

Figure 7:
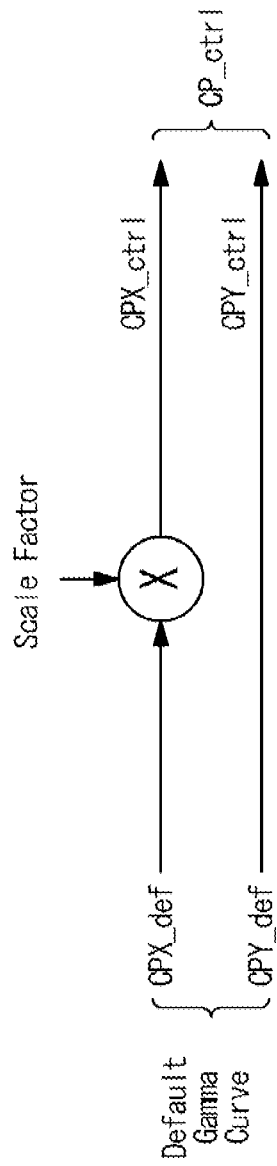
FIG. 7 illustrates an example generation of the control point data, according to one or more embodiments.

FIG. 7 illustrates an example generation of the control point data CP_ctrl, according to one or more embodiments. In the illustrated embodiment, the scaling circuitry 34 is configured to determine the X coordinates of the control points specified in the control point data CP_ctrl by multiplying the X coordinates CPX_def of the corresponding default control points of the default gamma curve by the scale factor determined as described above. The Y coordinates of the control points specified in the control point data CP_ctrl are determined as being identical to the Y coordinates CPY_def of the default control points. These calculations achieve scaling the default gamma curve along the X axis.

Figure 8:
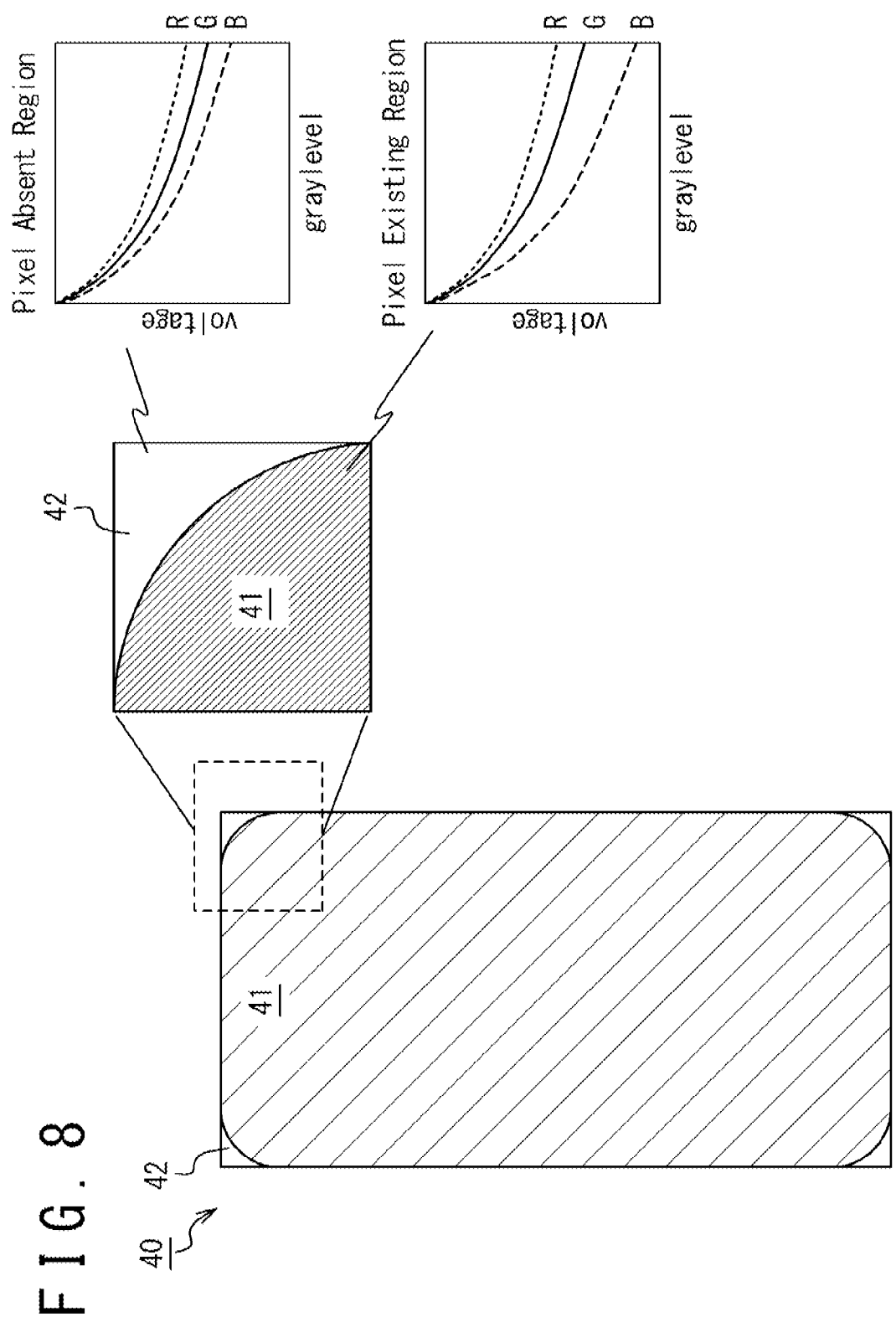
FIG. 8 illustrates an example configuration of a display panel, according to one or more embodiments.

FIG. 8 illustrates an example configuration of a display panel 40, according to one or more embodiments. In the illustrated embodiment, the display panel 40 includes a pixel existing region 41 and pixel absent regions 42 disposed at the corner of the display panel 40. The pixel existing region 41 is a region in which pixels (which each include three or more pixel circuits 12) are disposed to display an image. The pixel absent regions 42 are regions in which no pixels are disposed. The pixel existing region 41 and the pixel absent regions 42 form a rectangular region.

In various implementations, the input image data D_in is defined for the entire rectangular region to simplify the generation process of the input image data D_in, although physical pixels are excluded from the pixel absent regions 42. In such implementations, the input image data D_in may include pixel data for "dummy pixels" of the pixel absent regions 42. The dummy pixels are defined only in the input image data D_in; no physical entities of the dummy pixels exist in the pixel absent regions 42. The pixel data for each dummy pixel may include graylevels defined for the corresponding dummy pixel.

The boundaries between the pixel existing region 41 and the pixel absent regions 42 may be jagged due to the pixel arrangement of the pixels in the pixel existing region 41. The jagged boundaries may cause poor appearance of the display panel 40. To improve the appearance at the boundaries between the pixel existing region 41 and the pixel absent regions 42, in one or more embodiments, a display driver may be configured to implement the above-described display brightness control based on scaling of a gamma curve along the X-axis.

Figure 9:
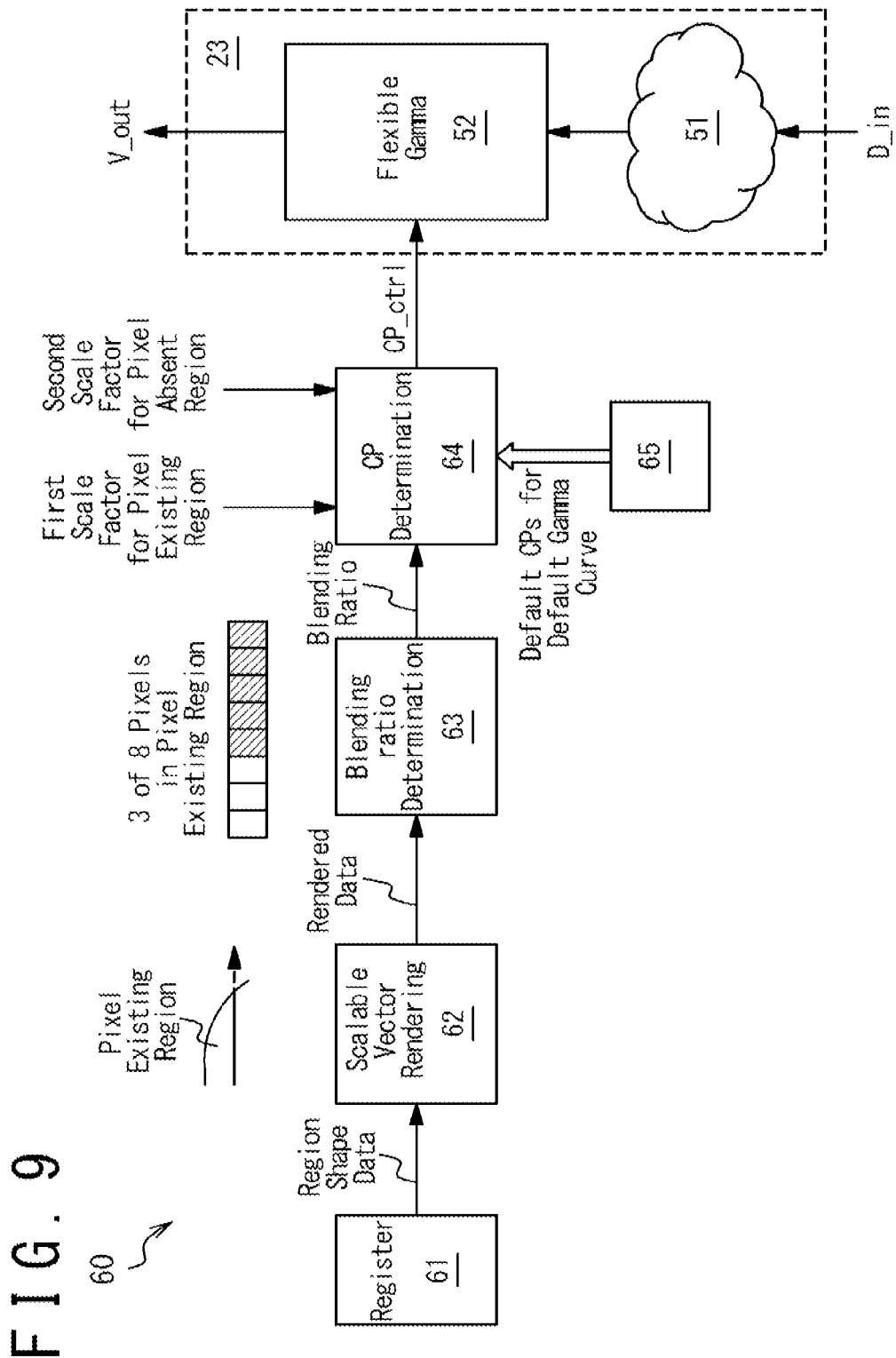
FIG. 9 illustrates an example configuration of control circuitry, according to one or more embodiments.

FIG. 9 illustrates an example configuration of control circuitry 60 of the display driver, according to one or more embodiments. The control circuitry 60 is configured similarly to the control circuitry 25 illustrated in FIG. 6A. In the illustrated embodiment, the control circuitry 60 includes register circuitry 61, scalable vector rendering circuitry 62, blending ratio determination circuitry 63, scaling circuitry 64, and storage circuitry 65. The register circuitry 61 is configured to store region shape data that represents the shape of the pixel existing region 41. The region shape data may include vector graphics data that represents the shape of the pixel existing region 41 in a vector graphics format. The region shape data may define the boundary of the pixel existing region 41.

The scalable vector rendering circuitry 62 is configured to render the boundary of the pixel existing region 41 based on the region shape data and determine the locations at which a target horizontal line of the gamma transformation crosses the boundary of the pixel existing region 41.

The blending ratio determination circuitry 63 is configured to determine a blending ratio for the target pixel based on the rendered data. The determined blending ratio is used to determine the scale factor of the scaling of the gamma curve by the scaling circuitry 64. In one implementation, the blending ratio determination circuitry 63 is configured to select the target pixel and a predetermined number of neighboring pixels of the target pixel from the pixels located on the target horizontal line. The neighboring pixels may include "dummy pixels" defined for a pixel absent region 42. In the illustrated embodiment, eight pixels, including the target pixel and dummy pixels, are selected. The blending ratio determination circuitry 63 may be further configured to determine, based on the locations at which the target horizontal line crosses the boundary of the pixel existing region 41, whether each of the target pixel and the neighboring pixels is located in the predetermined region and determine the count of in-region pixels located in the pixel existing region 41 of the selected target pixel and neighboring pixels. The blending ratio determination circuitry 63 may be further configured to determine the blending ratio based on the ratio of the count of the in-region pixels to the total number of the selected target pixel and neighboring pixels. In one implementation, the blending ratio may be equal to the ratio of the count of the in-region pixels to the total number of the selected target pixel and neighboring pixels. In the illustrated embodiment in which three of the eight selected pixels are located in the pixel existing region 41, the blending ratio may be determined as 0.375 (=3/8).

The scaling circuitry 64 is configured to determine the gamma curve for the gamma transformation performed by the flexible gamma circuitry 52. In one implementation, the scaling circuitry 64 may be configured to generate the control point data CP_ctrl that defines the gamma curve in a similar manner to the scaling circuitry 34 illustrated in FIG. 6A except for that the first scale factor is defined for the pixel existing region 41 and the second scale factor is defined for the pixel absent region 42. The scale factor of the scaling of the default gamma curve for the target pixel is dependent on the blending ratio determined by the blending ratio determination circuitry 63. In embodiments where the default gamma curve is defined for the pixel existing region 41, the first scale factor defined for the pixel existing region 41 may be one.

In one implementation, the storage circuitry 65 is configured to store the locations of a set of default control points that define the default gamma curve, and the scaling circuitry 64 is configured to generate the control point data CP_ctrl based on the locations of the set of default control points. The scaling circuitry 64 may be configured to determine the X coordinates of the control points specified in the control point data CP_ctrl by multiplying the X coordinates of the corresponding default control points of the default gamma curve by the scale factor determined as described above. The Y coordinates of the control points specified in the control point data CP_ctrl are determined as being identical to the Y coordinates of the default control points. These calculations achieve scaling the default gamma curve along the X axis.

Figure 10:
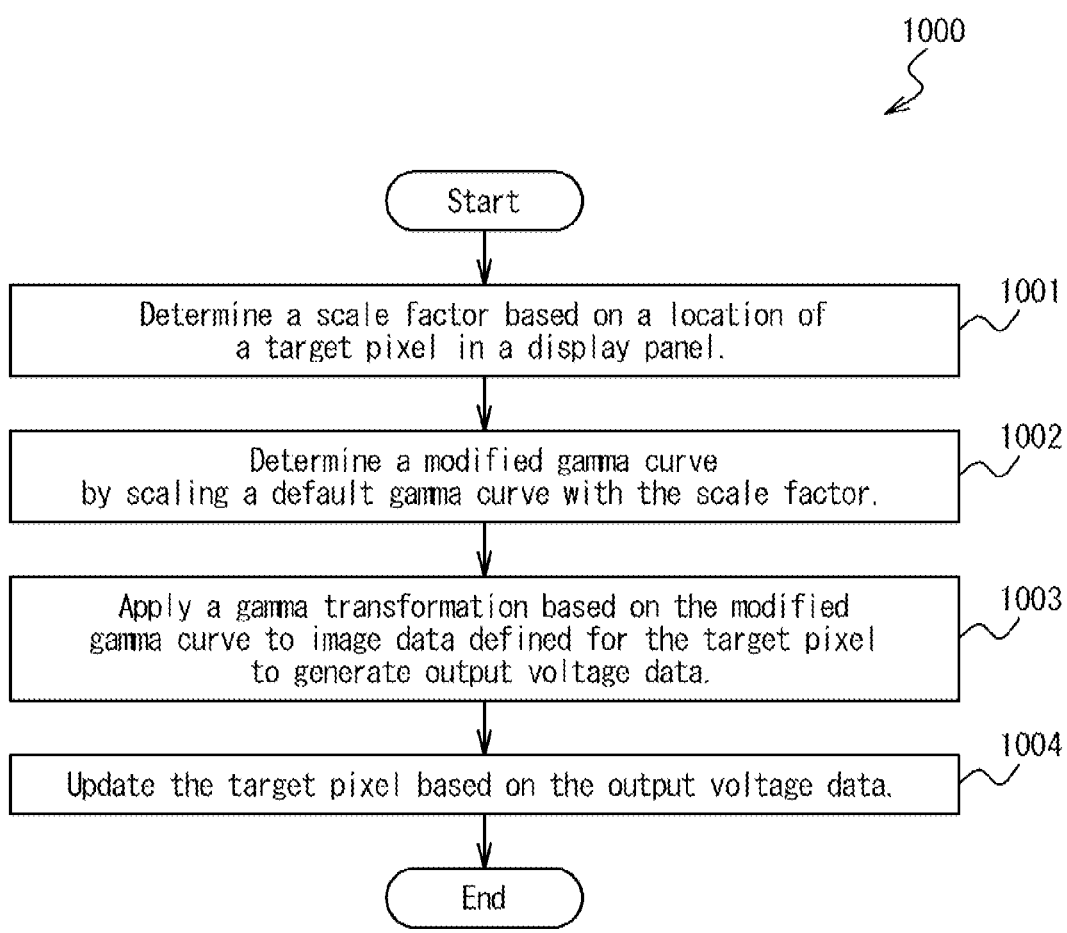
FIG. 10 illustrates an example method of driving a display panel, according to one or more embodiments.

Method 1000 of FIG. 10 illustrates steps for driving a display panel, according to one or more embodiments. It should be noted that the order of the steps may be altered from the order illustrated. At step 1001, a scale factor is determined based on a location of a target pixel in a display panel (e.g., the display panels 10 and 40 illustrated in FIGS. 1A-1C and FIG. 8). At step 1002, a modified gamma curve is determined by scaling a default gamma curve with the scale factor. At step 1003, a gamma transformation based on the modified gamma curve is applied to image data defined for the target pixel (e.g., the input image data D_in) to generate output voltage data (e.g., the output voltage data V_out). At step 1004, the target pixel is updated based on the output voltage data.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display driver, comprising:
   control circuitry configured to:
     store a default gamma curve,
     determine, for a respective area of a display panel comprising a respective target pixel, a count of in-region pixels within the respective area, wherein the respective area has a total number of pixels including the respective target pixel and a number of neighboring pixels of the respective target pixel, and wherein the in-region pixels within the respective area are pixels which are located both in a predetermined region of the display panel and within the respective area,
     determine a scale factor based on a ratio of the count of the in-region pixels within the respective area to the total number of pixels of the respective area, and
     determine a modified gamma curve by scaling the default gamma curve with the scale factor; and
   image processing circuitry configured to apply a gamma transformation based on the modified gamma curve to image data defined for the target pixel to generate output voltage data for the target pixel.

2. The display driver of claim 1, wherein scaling the default gamma curve comprises scaling the default gamma curve with the scale factor along an axis that represents graylevels.

3. The display driver of claim 1, further comprising driver circuitry configured to update the target pixel based on the output voltage data.

4. The display driver of claim 1, wherein determining the count of the in-region pixels within the respective area comprises determining how many pixels of the respective area are located in the predetermined region.

5. The display driver of claim 1, wherein brightness of the predetermined region is increased in response to the display driver being placed in a local high brightness mode.

6. The display driver of claim 1, wherein determining the scale factor comprises determining the scale factor such that brightness of a region of the display panel external to the predetermined region is lower than brightness of the predetermined region.

7. The display driver of claim 1, wherein the display panel comprises:
   a pixel-absent region in which no pixels are disposed; and
   a pixel-existing region in which pixels are disposed,
     wherein the predetermined region excludes the pixel-absent region.

8. The display driver of claim 1, wherein determining the count of the in-region pixels within the respective area further comprises determining, based on region shape data stored by the control circuitry, a location at which a target horizontal line crosses a boundary of the predetermined region.

9. The display driver of claim 8, wherein determining the count of the in-region pixels within the respective area further comprises determining the count of the in-region pixels within the respective area based on the determined location at which the target horizontal line crosses the boundary of the predetermined region.

10. A semiconductor device, comprising:
    storage circuitry configured to store a default gamma curve;
    control circuitry configured to:
      determine, for a respective area of a display panel comprising a respective target pixel, a count of in-region pixels within the respective area, wherein the respective area has a total number of pixels including the respective target pixel and a number of neighboring pixels of the respective target pixel, and wherein the in-region pixels within the respective area are pixels which are located both in a predetermined region of the display panel and within the respective area,
      determine a scale factor based on a ratio of the count of the in-region pixels within the respective area to the total number of pixels of the respective area, and
      determine a modified gamma curve by scaling the default gamma curve with the scale factor; and
    image processing circuitry configured to apply a gamma transformation based on the modified gamma curve to image data defined for the target pixel to generate output voltage data for the target pixel.

11. The semiconductor device of claim 10, wherein scaling the default gamma curve comprises scaling the default gamma curve with the scale factor along an axis that represents graylevels.

12. The semiconductor device of claim 10, wherein determining the count of the in-region pixels within the respective area comprises determining how many pixels of the respective area are located in the predetermined region.

13. The semiconductor device of claim 10, wherein brightness of the predetermined region is increased in response to an activation of a local high brightness mode.

14. The semiconductor device of claim 10, wherein determining the scale factor comprises determining the scale factor such that brightness of a region of the display panel external to the predetermined region is lower than [the] brightness of the predetermined region.

15. The semiconductor device of claim 10, wherein the display panel comprises:
   a pixel-absent region in which no pixels are disposed; and
   a pixel-existing region in which pixels are disposed,
   wherein the predetermined region excludes the pixel-absent region.

16. The semiconductor device of claim 10, wherein determining the count of the in-region pixels within the respective area further comprises determining, based on region shape data stored by the control circuitry, a location at which a target horizontal line crosses a boundary of the predetermined region.

17. The semiconductor device of claim 16, wherein determining the count of the in-region pixels within the respective area further comprises determining the count of the in-region pixels within the respective area based on the determined location at which the target horizontal line crosses the boundary of the predetermined region.

18. A method, comprising:
   storing a default gamma curve;
   determining, for a respective area of a display panel comprising a respective target pixel, a count of in-region pixels within the respective area, wherein the respective area has a total number of pixels including the respective target pixel and a number of neighboring pixels of the respective target pixel, and wherein the in-region pixels within the respective area are pixels which are located both in a predetermined region of the display panel and within the respective area;
   determining a scale factor based on a ratio of the count of the in-region pixels within the respective area to the total number of pixels within the respective area;
   determining a modified gamma curve by scaling the default gamma curve with the scale factor; and
   applying a gamma transformation based on the modified gamma curve to image data defined for the target pixel to generate output voltage data for the target pixel.

19. The method of claim 18, wherein scaling the default gamma curve comprises scaling the default gamma curve with the scale factor along an axis that represents graylevels.

20. The method of claim 18, wherein determining the count of the in-region pixels within the respective area comprises determining how many pixels of the respective area are located in the predetermined region.

* * * * *